Feb. 15, 1955  O. J. MAHA  2,702,094
LUBRICATOR
Filed May 26, 1948

Inventor.
Otto J. Maha,
by Roland C Lehn
Attorney.

United States Patent Office 2,702,094
Patented Feb. 15, 1955

2,702,094

LUBRICATOR

Otto J. Maha, Chicago, Ill., assignor to Hannifin Corporation, Chicago, Ill., a corporation of Illinois Application May 26, 1948, Serial No. 29,389

5 Claims. (Cl. 184—55)

This invention relates to improvements in lubricators and particularly to lubrication of pneumatically operated devices by introduction of lubricant into an air line leading to such device.

Among other objects, the invention aims to provide a simple and durable lubricator which can be easily refilled without cutting off air pressure.

Another object is to provide means in a lubricator for automatically insuring resumption of lubricant supply upon completion of filling of the lubricator.

The nature of the invention may be readily understood by reference to one illustrative lubricator embodying the invention and shown in the accompanying drawing.

Figure 1:
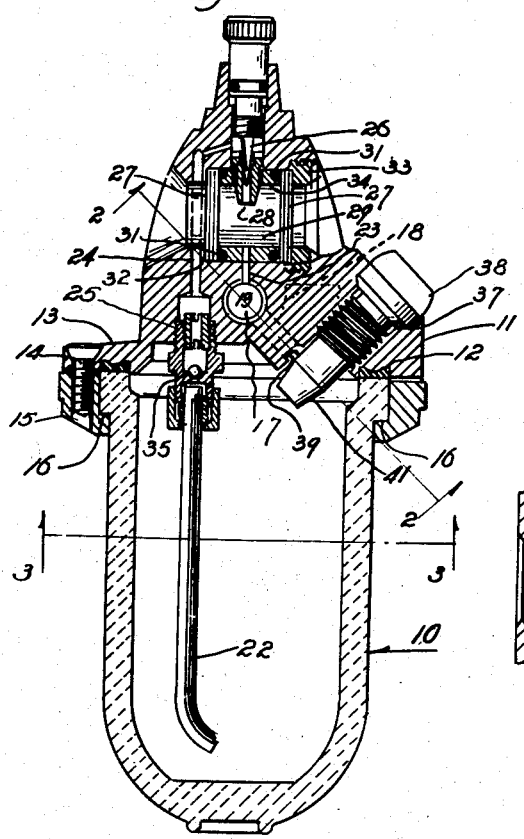
Fig. 1 is a vertical section through the lubricator taken on radial planes 1—1 of Fig. 3, passing through the filler opening and through the lubricant feeding line to permit illustration in a single figure of the important features of the device.

Lubricators of the type here illustrated are adapted to be placed in an air pressure line, and operate by a pressure differential created therein and imposed on the lubricant, which pressure differential forces the lubricant at a regulated rate into the air stream by which it is carried to the device to be lubricated. Specifically an air pressure drop is produced sufficient to cause the lubricant to flow toward the point of lowered pressure. Since the lubricator is subjected to line pressure, refilling is practically impossible unless the air pressure is temporarily cut off from the lubricator reservoir. This has been accomplished in various ways, none of which have been completely satisfactory. Manual cutting off of air pressure is the most satisfactory method provided the operator always remembers to cut off the pressure prior to opening the reservoir and then to restore pressure after refilling. The illustrative lubricator embodies the advantages of the aforesaid manual operation with none of its disadvantages.

In such lubricator the lubricant reservoir is represented by a plain elongated vessel 10 closed at the top and in this case supported, by a cover 11. The joint between the vessel and cover is sealed by a gasket 12 clamped between cover flange 13 and the top edge of the vessel. Screws 14 or the like fasten the cover to a clamping ring 15 which is seated behind an outwardly projecting retaining flange or rib 16, in this case integral with the vessel.

Figure 2:
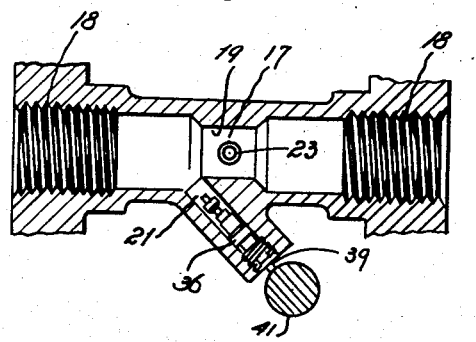
Fig. 2 is an enlarged section through the main air passage and is taken on the inclined plane 2—2 of Fig. 1 to illustrate the operation of a valve controlling communication of pressure between the main air passage and the lubricator reservoir.
Figure 3:
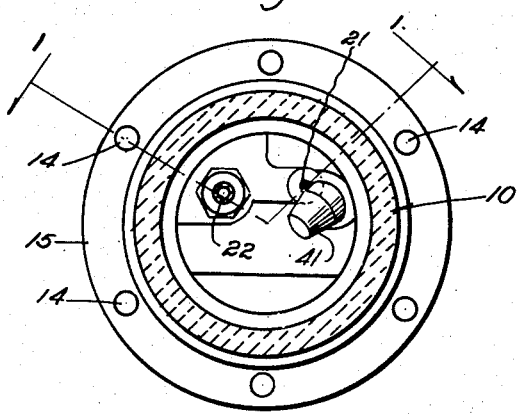
Fig. 3 is a bottom plan section through the lubricator taken on the plane 3—3 of Fig. 1.

Cover 11 is formed with a passage 17 adapted to be connected in an air or like line and for which purpose the passage is provided with standard fittings 18 for coupling in such line. Passage 17 is provided with a constriction 19 or the like for producing a small pressure drop in the air stream so that a pressure differential sufficient to feed lubricant (oil) into the line, exists in the passage. The region of high pressure is communicated to the surface of the lubricant by passage 21 leading, in this case, from a point in the passage in advance of the constriction, and opening on the interior of the vessel at the underside of the cover (Fig. 2). If the passage with its constriction be in the form of a venturi throat sufficiently efficient to restore substantially normal pressure beyond the throat of the venturi, it would be immaterial whether passage 21 is connected with passage 17 in advance of or beyond the venturi throat.

The reduced pressure existing in the restricted portion of passage 17 is communicated to the body of lubricant itself through a line 22, with the result that the aforesaid pressure differential forces lubricant through line 22 into passage 17 at the constriction 19 with which line 22 is connected by passage 23. Line 22 is here shown in the form of a tube of a length adjusted to extend nearly to the bottom of the reservoir and connected with passage 24 in the cover by appropriate couplings 25. Passage 24 advantageously is provided with a feed regulating device in the form of a needle valve 26 by which the rate of lubricant feed may be regulated. Such regulation is facilitated by opposite sighting windows 27 through which the rate at which the lubricant drops from the valve nozzle 28, may be observed. Passage 23 preferably extends downwardly from the sight feed chamber 29 into the air line 17. Windows 27 are in this case circular and sealed in the chamber by sealing rings 31. One of the windows is seated against the annular flange 32 around the sight opening. A screw threaded clamp ring 33 and an intervening sleeve 34 applies sealing pressure to both windows.

Line 22 is advantageously provided with a check valve 35 (here located in one of the coupling fittings 25) to prevent return flow by gravity of the lubricant in line 22 and passage 24, during idle times or whenever there is no pressure differential. Thus the line advantageously remains filled with lubricant, and feeding thereof to the line resumes promptly on restoration of the pressure differential.

To cut off the interior of the lubricant reservoir from line pressure when the reservoir is open for filling, a valve 36 is placed in passage 21. The valve is advantageously associated with the filling opening 37 so as to be operated by the filler plug 38 for the filling opening. The valve is preferably of a poppet type (i. e. opening and closing by longitudinal movement) and may advantageously be similar to a tire valve whose stem 39 is operated by the cam surface 41 on the filler plug. The latter is here shown in the form of a screw threaded plug having a tapered extremity (forming the cam surface 41) extending to or beyond the stem 39 and operating to move the same inwardly to open the valve when the plug is screwed in the filler opening. Removal of the plug allows the valve stem to shift to close the passage 21. Thus it is impossible to open the reservoir for filling without cutting off the air pressure therefrom or to close the filler opening without again restoring air pressure to the reservoir and resuming feeding of lubricant. It is unnecessary to interrupt the flow of air to the device operated thereby, and feeding of the lubricant into the line is interrupted only during the short interval of filling of the reservoir.

Obviously the invention is not limited to the details of the illustrative device, since these may be variously modified. Moreover, it is not indispensable that all features of the invention be used conjointly, since various features may be used to advantage in different combinations and sub-combinations.

Having described my invention I claim:

1. A lubricator of the character described comprising in combination a lubricant reservoir, a filling opening therefor having a removable closure, a passage in said lubricator adapted to be connected in an air line and having therein means for producing a pressure drop in the air passing through said passage, a connecting passage leading from the region of higher pressure in said passage to the interior of said reservoir to impose said higher pressure on the surface of the lubricant, a line leading from the body of the lubricant to the region of lower pressure in said passage, whereby the pressure drop forces lubricant from said reservoir into said passage, a normally closed valve in said connecting passage controlling access of pressure to the lubricant, said valve having an operating element leading to and engaged by said closure when the latter is in position to hold said valve open, said operating element being releasable upon removal of said closure to close said valve.

2. A lubricator of the character described comprising in combination a lubricant reservoir, a cover therefor, said cover having a passage therein adapted to be connected in an air line, said passage having a restriction to cause a pressure drop therein, thereby to produce separate regions of higher and lower pressures in said passage, a filling opening in said cover communicating with the interior of said reservoir, a removable closure plug for said opening, a connecting passage leading from the region of high pressure in said passage to the interior of said reservoir, a feed line leading from a point below the level of the lubricant to the region of lower pressure in said passage whereby said pressure drop forces lubricant from said reservoir into said air line, a normally closed valve in said connecting passage controlling access of pressure to the lubricant and having a valve operating stem extending into operative relation with said filling plug, the latter having a surface adapted to engage said stem when the plug is in position in said filling opening to open said valve, said operating element being releasable on removal of said plug to close said valve.

3. A lubricator of the character described comprising in combination a lubricant reservoir, a cover therefor, said cover having a passage therein adapted to be connected in an air line, said passage having a restriction to cause a pressure drop therein, thereby to produce separate regions of higher and lower pressures in said passage, a filling opening in said cover communicating with the interior of said reservoir, a removable closure plug for said opening, a connecting passage leading from the region of high pressure in said passage to the interior of said reservoir, a feed line leading from a point below the level of the lubricant to the region of lower pressure in said passage whereby said pressure drop forces lubricant from said reservoir into said air line, a normally closed valve in said connecting passage controlling access of pressure to the lubricant and having a valve operating stem extending to and transversely of said filling plug, the latter having a cam surface adapted when the plug is in position to engage and depress said stem to hold said valve open, said plug releasing said stem on removal of the plug to close said connecting passage.

4. In a lubricator for feeding lubricant into an air line by means of a pressure drop created in said line, the combination comprising a reservoir, a cover therefor, said cover having a passage therein adapted to be connected in an air line and having a restriction to produce the aforesaid pressure drop thereby to create separate regions of higher and lower pressures in said passage, a filling opening in said cover communicating with the interior of said reservoir, a screw threaded removable closure plug for said opening having a tapered extremity projecting into said opening, a connecting passage leading from the region of higher pressure in said passage to the interior of said reservoir, a feed line leading from a point below the level of the lubricant to the region of lower pressure in said passage whereby said pressure drop forces the lubricant from said reservoir into said air line, a normally closed valve in said connecting passage controlling access of pressure to the lubricant and having a valve operating stem extending transversely of and into operative relation with the tapered extremity of said filling plug, the latter being adapted when the plug is in position to engage and depress said stem to hold said valve open, said plug releasing said stem to close said connecting passage upon removal of said plug.

5. A lubricator of the character described comprising in combination a lubricant reservoir, a filling opening therefor having a removable closure, a passage in said lubricator adapted to be connected in an air line and having therein means for producing a pressure drop in the air passing through said passage, a connecting passage leading from the region of higher pressure in said passage to the interior of said reservoir to impose said higher pressure on the surface of the lubricant, a line leading from the body of the lubricant to the region of lower pressure in said passage, whereby the pressure drop forces lubricant from said reservoir into said passage, a normally closed valve in said connecting passage controlling access of pressure to the lubricant, said valve comprising an element engaged by said closure when the latter is in position to hold said valve open, said element being releasable upon removal of said closure to close said valve.

References Cited in the file of this patent

UNITED STATES PATENTS 2,223,700  Norgren  Dec. 3, 1940